(12) United States Patent
Zoppas

(10) Patent No.: US 10,440,779 B2
(45) Date of Patent: Oct. 8, 2019

(54) PROCESS FOR THE PRODUCTION OF FLEXIBLE RESISTANCES

(71) Applicant: I.R.C.A. S.P.A. INDUSTRIA RESISTENZE CORAZZATE E AFFINI, San Vendemiano (IT)

(72) Inventor: Federico Zoppas, Treviso (IT)

(73) Assignee: I.R.C.A. S.P.A. INDUSTRIA RESISTENZE CORAZZATE E AFFINI, San Vendemiano (IT)

( * ) Notice: Subject to any disclaimer, the term of this patent is extended or adjusted under 35 U.S.C. 154(b) by 186 days.

(21) Appl. No.: 15/325,152

(22) PCT Filed: Jul. 14, 2015

(86) PCT No.: PCT/IB2015/055314
§ 371 (c)(1),
(2) Date: Jan. 10, 2017

(87) PCT Pub. No.: WO2016/009345
PCT Pub. Date: Jan. 21, 2016

(65) Prior Publication Data
US 2017/0188414 A1    Jun. 29, 2017

(30) Foreign Application Priority Data
Jul. 14, 2014    (IT) .............................. RM2014A0383

(51) Int. Cl.
*H05B 3/00*     (2006.01)
*H05B 3/26*     (2006.01)
(Continued)

(52) U.S. Cl.
CPC ........... *H05B 3/26* (2013.01); *B23K 26/0661* (2013.01); *B23K 26/38* (2013.01);
(Continued)

(58) Field of Classification Search
CPC ........ H05B 2203/017; H05B 2203/003; H05B 3/26; B23K 26/38; B23K 26/0661;
(Continued)

(56) References Cited

U.S. PATENT DOCUMENTS 3,495,328 A    2/1970   Moerke
4,081,653 A *  3/1978   Koo ..................... B23K 26/009
                                                219/121.68
(Continued)

FOREIGN PATENT DOCUMENTS

DE    102005054611 A1    5/2006

OTHER PUBLICATIONS

PCT International Search Report & Written Opinion of ISA for PCT/IB2015/055314, dated Nov. 9, 2015.
(Continued)

*Primary Examiner* — Thiem D Phan
(74) *Attorney, Agent, or Firm* — Abelman, Frayne & Schwab

(57) ABSTRACT

A process for the production of laminar electric resistances having plan geometry according to a predetermined pattern. The laminar electric resistances are formed by a metallic foil, a rigid first template, a trace and at least one sheet of insulating material. The trace is shaped to substantially trace the plan geometry of the predetermined pattern forming a path. The first template includes a fixing means adapted to fix the metallic foil. The trace has a height from the base between 10 and 50 mm. The process includes the steps of: fixing the metallic foil onto the first template by means of fixing means; cutting, according to a predetermined pattern, the metallic foil with a laser to obtain a cut foil; adhering a first sheet of insulating material to a surface of the cut foil which is distal from the first template; and detaching the cut foil from the first template.

13 Claims, 5 Drawing Sheets

(51) Int. Cl.
*B23K 26/06* (2014.01)
*B23K 26/38* (2014.01)
*B23K 101/36* (2006.01)

(52) U.S. Cl.
CPC .... *B23K 2101/36* (2018.08); *H05B 2203/003* (2013.01); *H05B 2203/017* (2013.01); *Y10T 29/49083* (2015.01)

(58) Field of Classification Search
CPC ....... B23K 2101/36; H05K 2203/0557; H05K 2203/107; Y10T 29/49155; Y10T 428/1338; Y10T 29/49083; Y10T 29/49117; Y10T 428/24917; Y10T 156/1052; F28F 21/081
USPC ......... 338/280, 254, 283; 219/528; 392/435; 29/611, 592.1, 610.1, 825
See application file for complete search history.

(56) References Cited

U.S. PATENT DOCUMENTS

| | | | | |
|---|---|---|---|---|
| 4,203,198 A | * | 5/1980 | Hackett | H05B 3/36 219/528 |
| 4,358,349 A | * | 11/1982 | Masami | H05K 3/108 205/126 |
| 6,323,460 B1 | | 11/2001 | Ohtsuka | |
| 2003/0178227 A1 | * | 9/2003 | Matsunaga | H05K 3/027 174/257 |

OTHER PUBLICATIONS

International Preliminary Report on Patentability for PCT/IB2015/055314, dated Jul. 5, 2016.

* cited by examiner

PROCESS FOR THE PRODUCTION OF FLEXIBLE RESISTANCES

CROSS REFERENCE TO RELATED APPLICATION

This application claims benefit under 35 U.S.C. § 371 to international application No. PCT/IB2015/055314, filed on Jul. 14, 2015, which claims to Italian application no. RM2014A000383, filed Jul. 14, 2014, the contents of which are incorporated by reference in their entireties.

FIELD OF THE INVENTION

The present invention relates to the production of heating electric resistances to be used, for example, in domestic appliances, in the industrial sector, in the transportation sector, in the medical sector etc.

PRIOR ART

The flat flexible heating element made of thin sheets, in the order of a few tens of microns, was developed to responds to specific needs of technologically advanced sectors. Today, such elements are widely used in all sectors in which an accurate, efficient heating is required, such as the medical, land transport and airspace fields, but also in domestic applications. This rapid development is due to some specific features of this element, such as for example:
great flexibility of use,
uniform thermal distribution on the entire surface of the resistance,
reduced thickness and weight which implies saving of material,
particular ease of installation,
specific capacity of being formed into complex shapes,
capacity of operating at high heat concentration,
specific capacity of operating with complex heat distributions,
higher heat transfer speed of the generated heat to the surrounding means,
longer average life that of a traditional resistance.

A technology similar to that of printed circuits is used to make the flexible sheet heating element. In general, the element is formed by various sheets of insulating material which enclose a metallic sheet appropriately etched and superimposed in layers, forming a given pattern corresponding to the shape of the final resistance.

FIG. 1 shows a typical forming process of resistive heating elements made on an insulating supporting surface corresponding to the prior art. The first step consists of cleaning the metallic foil as part of continuous element. The second step consists of the coupling of such a metallic foil to a sheet of insulating material which works as support. The next step consist of applying a film which is sensitive to ultraviolet (UV) rays onto the metallic foil. The film is applied by means of pressure and heat. The image of the circuit pattern is then projected onto the film by applying UV radiation. The next step consists of developing by means of a chemical solution which removes the part of the film from the areas which are not exposed to UV radiation. The metal which does not belong to the pattern, i.e. which is not protected by the film, is etched and removed by means of a subsequent chemical process. At this point, the radiated film which covers the pattern can also be removed to leave only the metal with the required shaping.

The process ends with a step of washing. According to application needs, the resistance may be covered with electrically insulating material, e.g. silicone material. Despite its maturity, the printed circuit technology has disadvantages due mainly to costs. As shown in FIG. 1, this type of processing requires large spaces, because of the number of steps of which the process consists and, above all, special environments, with particular precautions for the operator, due to the use of acids, which are moreover relatively costly together with the other consumable materials, in addition to being harmful for the environment, and thus require precautions for their correct disposal. Furthermore, the adhesion of an insulating layer to the resistance itself is negatively influenced because of the chemical treatment to which the resistance is subjected. A considerable problem is also caused by the difficult handling of the foil during the steps of the production process because of its thinness and because the foil is particularly flexible and has the tendency to roll up during cutting and handling. Another drawback is the impossibility of recovering the waste material which is generally mixed with acids, which increases the cost of the process. It is thus felt the need to make a new production process of thin sheet planar resistances which overcomes the aforesaid drawbacks by reducing production costs and either eliminating or reducing the use of chemical substances.

Other types of conductive elements and respective production processes are known in addition to the heating element described above. For example, document DE 10 2005054611 describes conductive elements made by means of perforated masks. Such masks are used for selectively depositing metals on specific areas of a rigid substrate by means of deposition in vapor phase. Document EP 0 699 974, instead, describes a process for making resistive elements starting from a resistive paste. The resistive paste is shaped as substantially rectangular strips by making it pass through a layer of low density material which may be penetrated by the resistive paste. A support provided with grooves or perforations is used to promote the separation of the strips.

However, this production concerns products different from the very thin flat and very flexible heating element introduced in this section of the prior art.

Furthermore, as can be inferred from the following description, the process and devices used for the production process, the starting product and the final product, as well as the problems which they intend to solve, are different from the following invention.

SUMMARY OF THE INVENTION

It is an object of the present invention to make a process for the production of flat resistances in sheets or thin foils having a complex plan pattern which reduces the number of processing steps with respect to the standard chemical etching process, thus also eliminating the use of acids, and which reduces and facilitates the recovery of waste material. It is a further object of the present invention to provide a process in which all the drawbacks related to the handling of the foil due to its reduced thickness are solved.

The present invention thus suggests to reach the objects described above by means of a process according to claim 1, for the production of laminar electric resistances having a plan geometry according to a predetermined pattern, wherein there are provided:
a metallic foil;
a first template, which has a rigid structure and a trace, the trace being shaped so as to have a plan geometry substantially tracing the plan geometry of said predetermined pattern forming a path, the first template having fixing means adapted to fix the foil;

at least one first sheet of insulating material; said process comprising the steps of:

fixing the metal foil onto said first template by means of fixing means;

cutting the metallic foil according to a predetermined pattern by means of a laser to obtain a cut foil;

adhering a first sheet of insulating material to the surface of the cut foil which is distal from the first template;

detaching the foil from the first template.

Although the use of lasers is already known for cutting thick metal sheets, the use of a laser for cutting thin sheets, or foils, of a very thin electric conductor metal, e.g. in the order of a few tens of microns thick, to make electric resistances was never used because of the considerable problems of foil handling mainly deriving from the thinness. In particular, such difficulties appear when it is desirable to obtain thin foil resistances with plan dimensions much greater than the thickness, in which the flexibility of the foil is an obstacle for the cutting process itself and for the subsequent steps.

Advantageously, the technical problem mainly due to the great flexibility of the foil, which otherwise could not be handled after the cut, is solved by virtue of the template.

The fixing means can be a plurality of holes connected to a suction system, magnetic means, adhesives etc.

Preferably, the fixing means are either a plurality of holes arranged along the path of the trace and connected to a suction system or are magnetic means (not shown), such as for example an electromagnet. By virtue of such fixing means, the foil to be cut can be reversibly fixed and then detached from the template at the end of the operation.

Furthermore, it is preferable for the foil to be cut to be in direct contact with template, e.g. without using supports which are not necessary, so as to have a simple, fast cutting process.

Preferably, adhering a second sheet of insulating material onto the surface of the cut foil on the side opposite to that of the first sheet is provided after the step of detaching of the foil from the template.

Preferably, the plan dimensions of the trace are slightly smaller than the plan dimensions of said predetermined pattern, even more preferably from approximately 5% to approximately 50% smaller.

Preferably, the template is made of metal or plastic material.

Preferably, but not exclusively, the metallic foil is between 5 and 200 µm thickness.

Preferably, a second template is also provided, in addition to the one mentioned above, provided with fixing means, by means of which the metallic foil is detached.

According to another aspect of the invention, the aforesaid problems are solved by means of a template, according to claim 9, for implementing the aforesaid process, the template having a rigid structure, and a trace, the trace being shaped so as to have a plan geometry substantially tracing the plan geometry of said predetermined pattern, and being provided with fixing means.

The fixing means can be a plurality of holes connectable to an extraction system, magnetic means, adhesives etc.

Preferably, the fixing means are either a plurality of holes arranged along the path of the trace connectable to a suction system, or are magnetic means (not shown) such as for example an electromagnet.

Preferably, the trace is in relief. For example, the trace is in relief with respect to a base plan, e.g. defined by a base. Preferably, the trace is in relief, having a height from the base plane comprised between 10 and 50 mm, e.g. 15 mm. Providing the trace in relief facilitates the removal, e.g. by suction, of waste material which accumulates on the base and prevents the template from being damaged by the laser beam.

Preferably, the plan dimensions of the trace are slightly smaller than the plan dimensions of said predetermined pattern, even more preferably from approximately 5% to approximately 50% smaller.

According to a further aspect of the invention, the aforesaid objects are obtained by means of laser machine for cutting metal to make thin electric resistances having plan geometry according to a predetermined pattern starting from a metallic foil.

Advantageously, the laser used is a laser with short wavelength and high repetition frequency.

BRIEF DESCRIPTION OF THE FIGURES

Further features and advantages of the invention will be apparent in light of the description of the process according to the invention, shown by way of non-limiting example with the help of the accompanying drawings, which are diagrammatic and not in scale, in which.

DESCRIPTION OF A PREFERRED EMBODIMENT OF THE INVENTION

Figure 2:
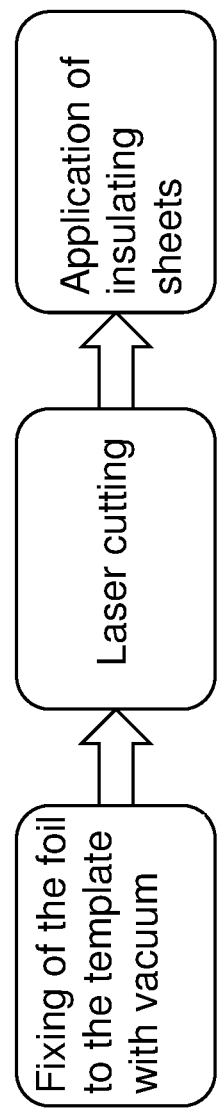
FIG. 2 is a block illustrating a production process for forming flat metallic resistances according to the invention.

In particular, FIG. 2 shows a process for the production of a flat, thin resistance which may also have a complex shape, by cutting with a laser beam or ray. Laser cutting is a rather mature, known technology and will therefore not be described.

We will only say that thin metal sheets, e.g. in the order of 5-500 µm, or for example 5-200 µm thick, can be laser cut using semiconductor or fiber lasers with short wavelengths in the realm of visible light, to avoid the reflection of the metallic surface which is higher at longer wavelengths. A typical laser may be an Ytterbium (Yb) laser with repetition frequencies of a few kHz and beam powers of a few tens of Watt, operating in second harmonics.

Figure 1:
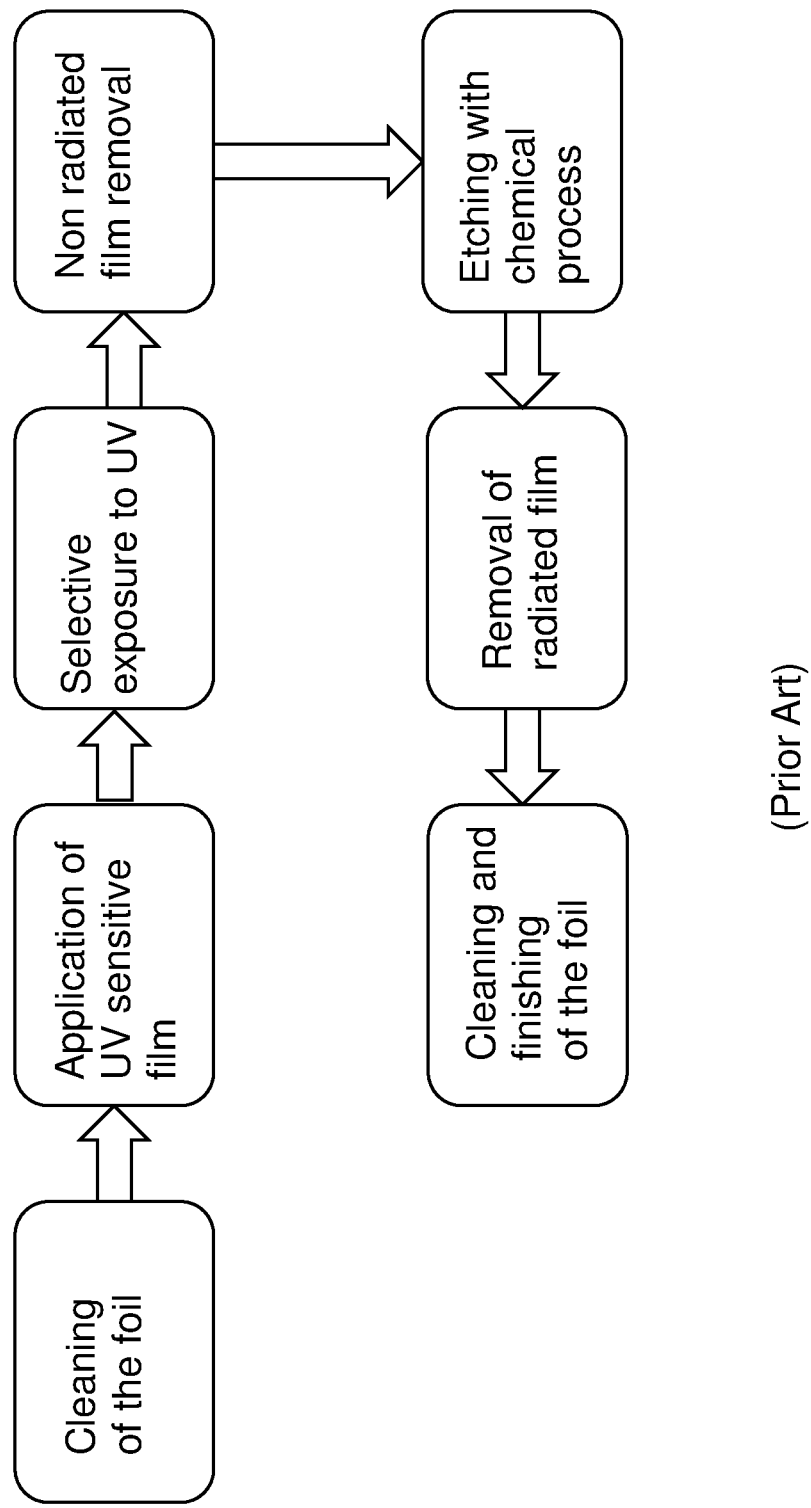
FIG. 1 shows a production process according to the prior art.

As shown in FIG. 2, the foil 1 can be fixed to a template and then cut by the laser cutting machine according to the instructions of a specific computer program, for example by means of a computer assistance manufacturing program, and in particular according to a predetermined pattern. The advantages of such an approach can be easily apparent by comparing FIG. 1 and FIG. 2:

Reduction of lead time,

Reduction of costs by eliminating costly consumable materials and reducing the time required for each cycle, Reduction of the space needed for the production line (up to 70%, 45 m² versus 10 m²)

Reduction of the energy consumption needed for the production process, the final product being equal, Reduction of the preparation time, Elimination of consumption of acids, with consequent reduction of risks for the operators and the environment, Reduction and ease of recovery of waste material, Reduction of maintenance costs, Better finished product quality.

Figure 4:
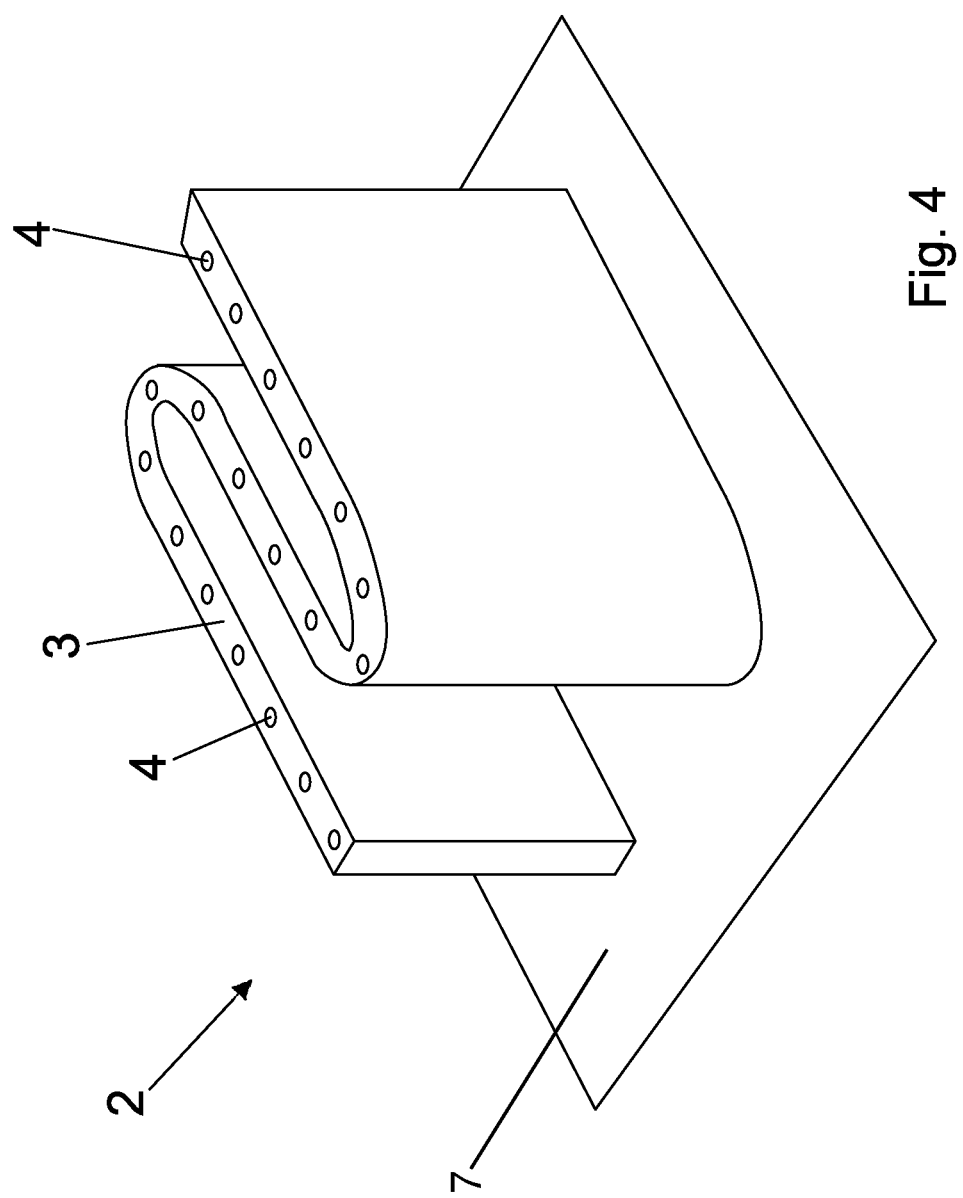
FIG. 4 shows a perspective view, diagrammatic and not in scale, of the template according to an embodiment of the present invention.
Figure 5:
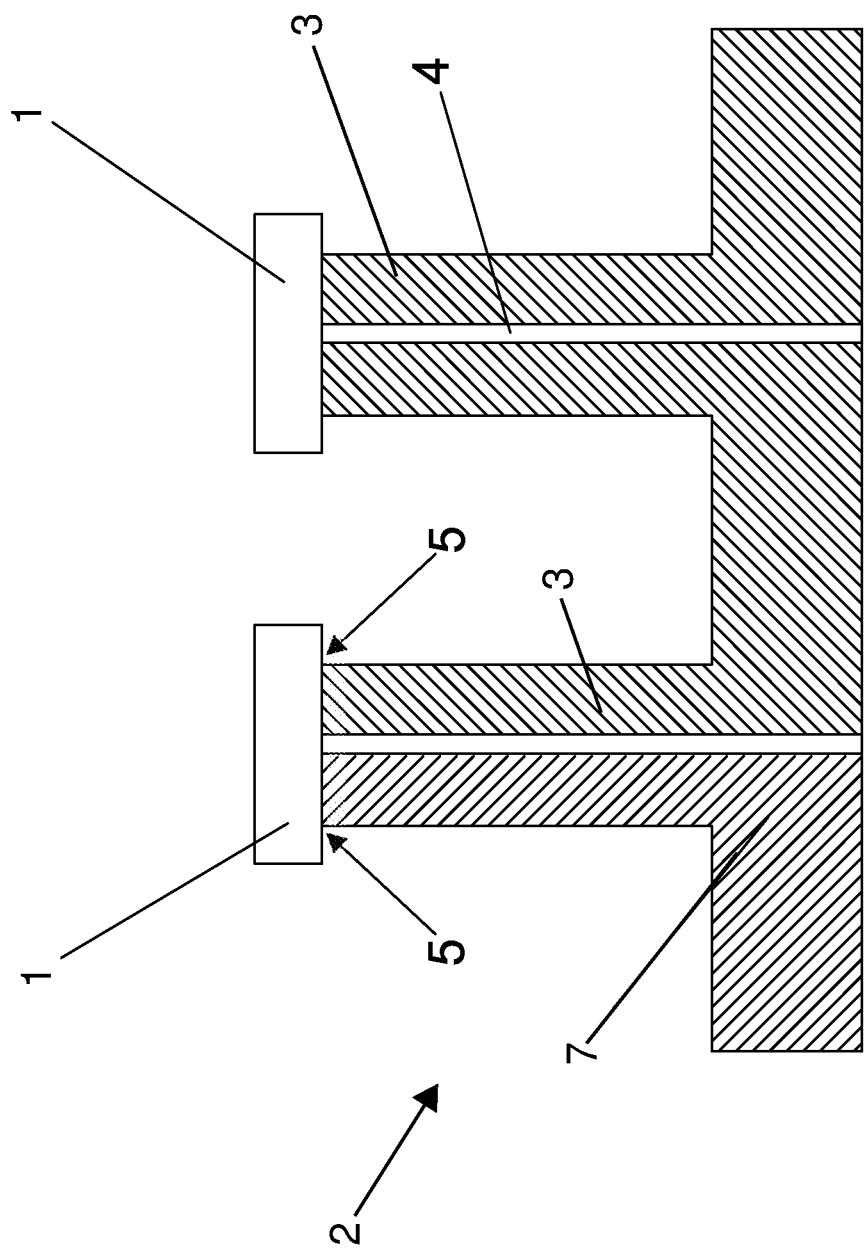
FIG. 5 shows, diagrammatically and not in scale, a part of a section of cut foil fixed to a template according to the present invention.

Advantageously, according to a particularly preferred method of the invention, the foil 1, before the laser cutting operation, is fixed to a template 2 which is provided with a trace 3. Preferably, the template 2 is shaped as a parallelepiped on side of which the trace 3 is cut. The trace 3 is preferably in relief. For example, the trace 3 is in relief with respect to a base 7. Preferably, the trace 3 is shaped so as to have the same geometric plan shape as the foil 1 once cut according to the desired pattern, i.e. that the plan geometry of the trace 3 substantially traces the desired pattern of the cut foil 1. Even more preferably, the dimensions of the geometric plan shape of the trace are slightly smaller than the final plan geometric of the foil 1 to be cut, e.g. from 5 to 50% smaller, or for example from 5 to 30% smaller, as shown in FIG. 5. Furthermore, as shown in FIG. 4, which illustrates a detail of the template 2, the template 2 is provided with a plurality of holes 4 connectable to a suction system which generates vacuum, e.g. a pump. By virtue of the holes 4 and the vacuum system, the foil 1 to be processed may be reversibly fixed to the template 2. Preferably, the template 2 is provided with holes 4, which open along the entire path of the trace 3, so as to fix the foil 1, also when it was cut, adequately otherwise it could be difficult to withhold and handle. For example, as shown in FIG. 5, the holes 4 could cross through the template 2, so that they could be connected to a suction system on one side, while on the other side they open towards the foil 1 to be cut. When the base 7 is present, the holes 4 can also cross the latter.

By virtue of these contrivances, the laser beam strikes the foil 1 to be processed without damaging the template 2, which may be reused.

Indeed, as shown in FIG. 5, which illustrates a detail of the template 2 to which the cut foil 1 is fixed, in this manner the foil 1 cut with the desired geometry slightly protrudes laterally with respect to the trace 3, forming a step 5. By virtue of the presence of the trace 3, the laser beam does not strike and does not damage the template 2, in particular the zones of the template 2 which are under the zones of the foil 1 on which the laser beam acts are not damaged.

It is worth noting that the laser ray would damage the template underneath if the template 2 did not have the trace 3, considering the thinness of the foil.

Furthermore, it is worth noting that the foil 1 which was cut and protrudes from the trace 3 is not subject to undesired bending because the dimensions of such a protruding portion are only slightly larger than the trace 3 of the template 2.

Indeed, the template 2 may be produced, preferably of metallic or plastic material, with known techniques, e.g. by molding or by chip forming.

Figure 3:
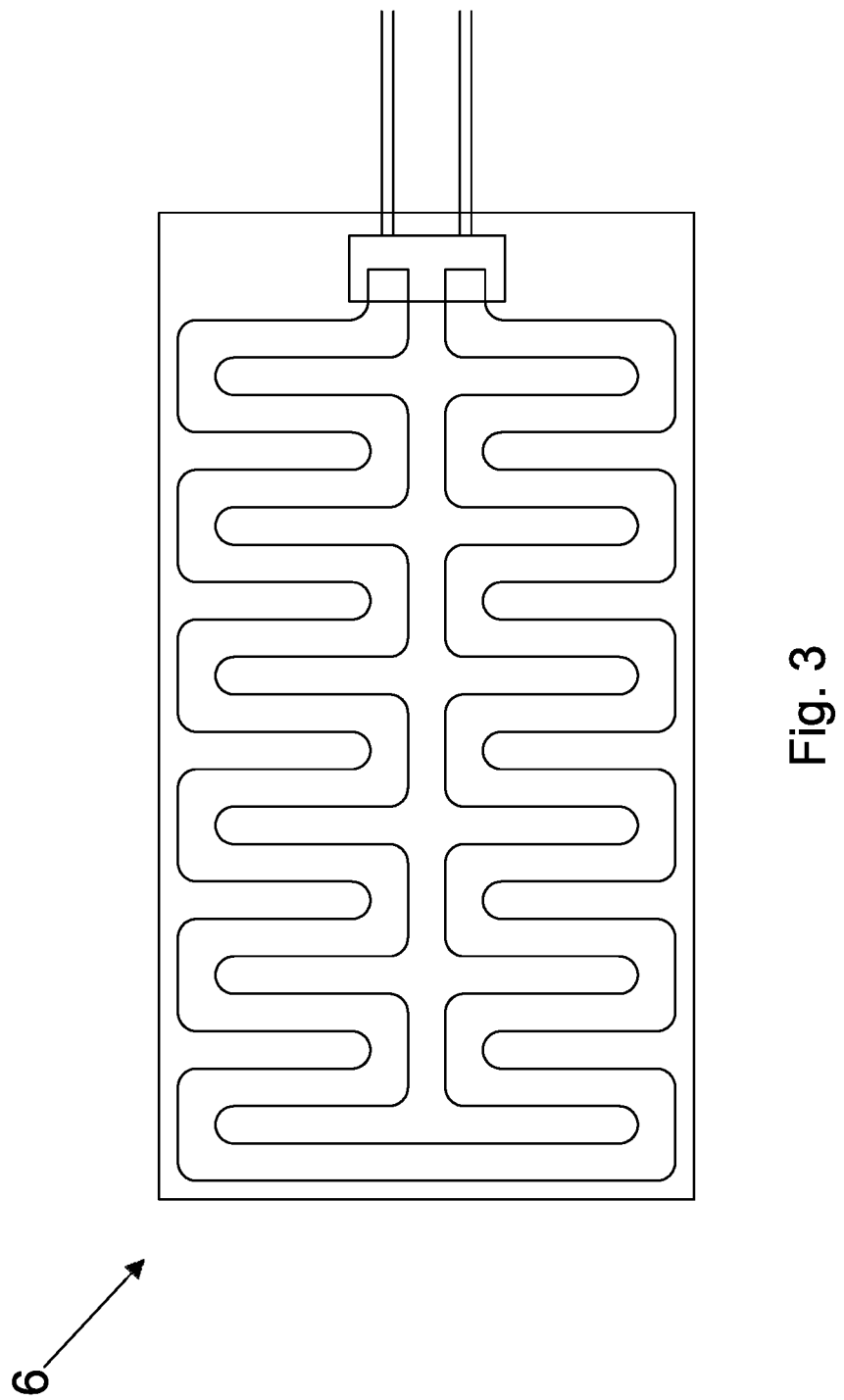
FIG. 3 shows a plan view from above, diagrammatic and not in scale, of the final shape of a flat heating resistance made of metallic foil ready for use.

FIG. 3 shows an example of embodiment of a finished or semi-finished product. In particular, a complex shape flat resistance 6 made by means of this new process is shown. The resistance 6 can either consist of the foil 1 incorporated between two sheets of insulating material or the foil 1 can be made to adhere on a sheet of insulation material. This is a product which can reproduce all the uses of the electric resistances made with the known process of the prior art. In particular, the cut foil 1 can be incorporated in an insulating material, e.g. silicon material. In particular, according to a preferred process of the invention, a sheet of insulating material is made to adhere to the cut foil 1 on the distal surface of the template 2, i.e. not in contact with the latter; subsequently, once the vacuum system is deactivated and the foil 1 is removed from the template 2, a second sheet of insulating material is made to adhere onto the free surface of the cut foil 1, i.e. the surface which during the cutting process was in contact with the template 2. The two sheets of insulating material adhere to the respective surfaces of the cut foil 1 and also to one another, thus providing a fluid-tight, insulating seal. The two sheets of insulating material may then be further cut according to a required geometry.

Furthermore, although possible, further preliminary cleaning and/or subsequent surface finishing operations are not necessary.

According to an alternative embodiment of the invention, in the process of the invention the foil is reversibly fixed to a template by means of magnetic force.

Preferably, the magnetic force is generated by an electromagnet with which the template according to the invention is provided.

According to a further embodiment of the invention, once the first layer of insulating material is made to adhere to the foil, a second template, equivalent to template 2, is used to pick, by means of vacuum or magnetic force, the first insulating layer, and thus the foil adhering thereto and position the foil on a second layer of insulating material to which it is made to adhere.

It is apparent for a person skilled in the art that a template according to the invention provided with suction and magnetic fixing means goes not beyond the scope of the present invention.

The invention claimed is:

1. A process for the production of laminar electric resistances having plan geometry according to a predetermined pattern, wherein there are provided:

a metallic foil;

a first template, which has a rigid structure and a trace, the trace being shaped so as to have a plan geometry substantially tracing the plan geometry of said predetermined pattern forming a path, the first template having fixing means adapted to fix the metallic foil and wherein the trace has a height from a base plane comprised between 10 and 50 mm;

at least one first sheet of insulating material;

said process comprising the steps of:

fixing the metallic foil onto the first template by means of fixing means;

cutting, according to a predetermined pattern, the metallic foil by means of a laser to obtain a cut foil;

adhering a first sheet of insulating material to a surface of the cut foil which is distal from the first template; and detaching the cut foil from the first template.

2. The process according to claim 1, wherein the fixing means are a plurality of holes connected to a vacuum system to fix the metallic foil in reversible manner.

3. The process according to claim 1, wherein the fixing means are magnetic means.

4. The process according to claim 1, further comprising adhering a second sheet of insulating material onto an opposing surface of the cut foil, said adhering of the second sheet occurring after the step of detaching the cut foil from the first template.

5. The process according to claim 1, wherein the plan dimensions of said trace are slightly smaller than the plan dimensions of said predetermined pattern, preferably from 5% to 50% smaller.

6. The process according to claim 1, wherein the first template is made of metal or plastic material.

7. The process according to claim 1, wherein the thickness of the metallic foil is between 5 and 200 µm.

8. The process according to claim 1, wherein a second template is provided, and wherein the detaching of the cut foil from the first template occurs by means of the action of said second template.

9. A template for implementing the process according to claim 1, which has a rigid structure and a trace, the trace being shaped so as to have a plan geometry substantially tracing the plan geometry of said predetermined pattern forming a path, being in relief with respect to a base of the template, and being provided with fixing means adapted to fix the metallic foil onto the template, and wherein the trace has a height from the base comprised between 10 and 50 mm.

10. The template according to claim 9, wherein the fixing means are a plurality of holes arranged along the path of the trace and connectable to a suction system, adapted to fix the metallic foil in reversible manner.

11. The template according to claim 9, wherein the fixing means consist of an electromagnet.

12. The template according to claim 9, wherein the plan dimensions of the trace are slightly smaller than the plan dimensions of said predetermined pattern, preferably from 5% to 50% smaller.

13. Use of a laser metal cutting machine for implementing the process according to claim 1.

* * * * *